June 11, 1935. B. D. BEDFORD 2,004,778
ELECTRIC VALVE CONVERTING APPARATUS
Filed Sept. 14, 1932
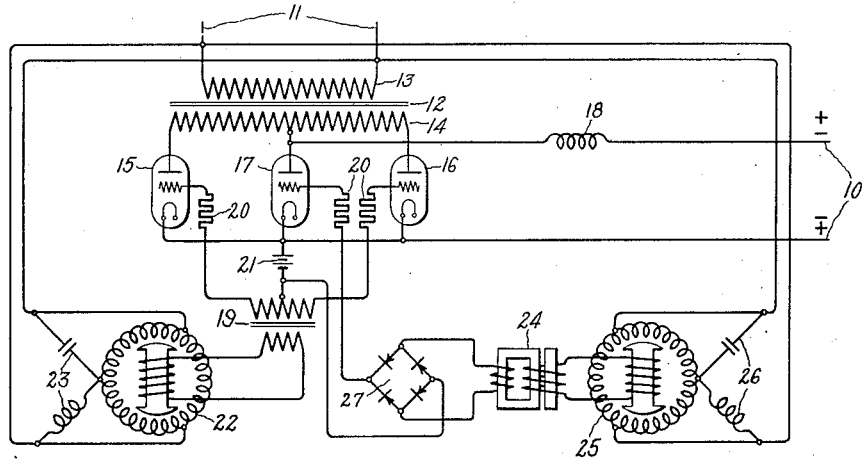
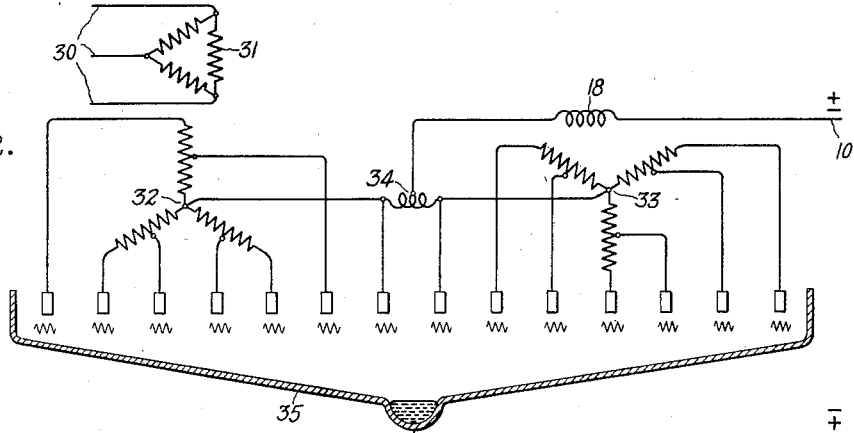
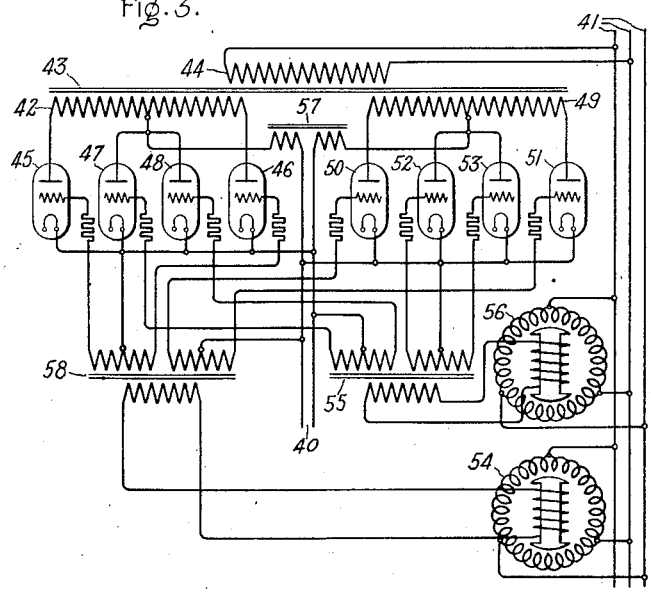
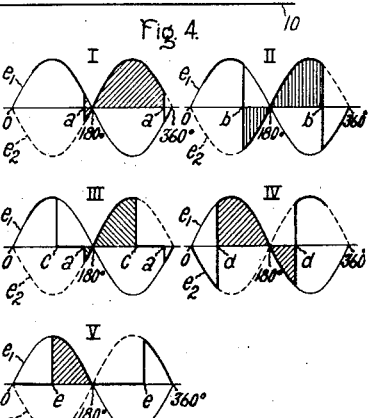
Inventor:
Burnice D. Bedford,
by Charles E. Tullar
His Attorney.

Patented June 11, 1935

2,004,778

UNITED STATES PATENT OFFICE 2,004,778

ELECTRIC VALVE CONVERTING APPARATUS

Burnice D. Bedford, Schenectady, N. Y., assignor to General Electric Company, a corporation of New York Application September 14, 1932, Serial No. 633,141

9 Claims. (Cl. 172—281)

My invention relates to electric valve converting apparatus and more particularly to such apparatus adapted to convert and control the energy transmitted between two electric circuits.

Heretofore, there have been devised numerous electric valve converting apparatus suitable for transmitting energy between direct and alternating current circuits, between direct current circuits of different voltages, or between independent alternating current circuits of the same or different frequencies. In each case the electric valve converting apparatus includes an alternating current circuit which may be either an intermediate alternating current circuit or the alternating current supply or load circuit. In such apparatus it has been customary to control the amount of energy transmitted between the circuits or the relative voltages of the two circuits or both, by applying to the grids of certain of the valves alternating potentials and varying the phase of these alternating potentials with respect to the potential of the alternating current circuit. However, the phase of the alternating grid potential determines the phase of the valve current and thus the power factor on the alternating current circuit. In the usual circuit containing substantial inductance, a displacement in the phase of the grid potentials of approximately 90 electrical degrees corresponds to the maximum controlling effect. In the arrangements of the prior art, however, a displacement in the phase of the grid potentials of substantially 90 electrical degrees corresponds to a power factor on the alternating current circuit approaching zero, that is, a current of the same order of magnitude as the full load current may flow, but it will be substantially all wattless current. The occurrence of these extremely low power factor currents on the alternating current circuit is usually highly undesirable from an operating standpoint, particularly in the case where energy is being received through a transmission circuit.

It is an object of my invention, therefore, to provide an improved electric valve converting apparatus for controlling and converting the energy transmitted between two electric circuits which will overcome the above mentioned disadvantages of the arrangements of the prior art and which will be simple and reliable in operation.

It is another object of my invention to provide an improved electric valve converting apparatus including an alternating current circuit by means of which the energy transmitted between two electric circuits may be readily controlled and the power factor on the alternating current circuit of the apparatus may be substantially improved.

In accordance with my invention a pair of electric circuits are interconnected through an electric valve converting apparatus including an inductive winding provided with end terminals and an electrical neutral and an electric valve connected to each of the terminals and the neutral of the inductive winding and interconnecting the circuits through the winding. Means are provided for independently controlling the conductivity of the valve connected to the neutral of the winding and the other of the valves to control the relative voltages of the circuit or the energy transmitted therebetween. In case the apparatus is operating as an inverter, transmitting energy from a direct current circuit to an alternating current circuit, and a single valve is connected to the electrical neutral, means must be provided for supplying it with a double frequency excitation variable in phase, while if two valves connected in parallel are connected to the electrical neutral they may be excited with alternating potentials displaced 180 electrical degrees in a manner similar to that of the valves connected to the end terminals. With such an arrangement operating as an inverter, for example, the minimum voltage on the alternating current circuit is obtained by maintaining the valve or valves connected to the electrical neutral of the inductive winding nonconductive and retarding the grid potentials of the other electric valves 180 electrical degrees less the necessary commutating angle. If now, the grid excitation of the valve or valves connected to the electrical neutral is advanced from 180 electrical degrees lagging, the load current will be shunted through this valve during the latter portion of each half cycle so that the resultant power factor on the alternating current circuit will be improved over that obtained when the regulation of the voltage of the alternating current circuits is obtained by advancing the phase of the grid potentials of the valves connected to the end terminals of the inductive windings.

For a better understanding of my invention, together with other and further objects thereof, reference is had to the following description taken in connection with the accompanying drawing, and its scope will be pointed out in the appended claims. Fig. 1 of the accompanying drawing illustrates a single phase electric valve converting apparatus embodying my invention for transmitting energy between direct and alternating current circuits; Fig. 2 represents an extension of my invention to a multiple winding polyphase valve converting apparatus for transmitting energy between direct and alternating current circuits, while Fig. 3 illustrates an electric valve frequency changing apparatus embodying my invention for transmitting energy between two single phase alternating current circuits, and Fig. 4 illustrates diagrammatically by curves the operating conditions of the apparatus.

Referring now more particularly to Fig. 1 of the drawing, there is illustrated an arrangement for transmitting energy between a direct current circuit 10 and a single phase alternating current circuit 11. This arrangement includes a transformer 12 having a winding 13 connected to the circuit 11 and a winding 14 provided with an electrical midpoint connected to one side of the direct current circuit 10 and with end terminals connected to the other side of the circuit 10 through electric valves 15 and 16. An electric valve 17 is also connected between the electrical neutral of the winding 14 and the other side of the direct current circuit. Each of the valves 15, 16 and 17 is provided with an anode, a cathode and a control grid and may be of any of the several types well known in the art, although I prefer to use valves of the vapor electric discharge type. The grids of the valves 15 and 16 are connected to their common cathode circuit through opposite halves of the secondary winding of a grid transformer 19, current limiting resistors 20 and a negative bias battery 21. The primary winding of the grid transformer 19 may be connected to any suitable source of alternating potential of a frequency which it is desired to supply to the circuit 11, or, in case the circuit 11 is connected to an independent source of electromotive force for determining its frequency, the primary winding of the transformer 19 may be energized therefrom through any suitable phase shifting arrangement, such for example, as a rotary phase shifting transformer 22 connected to the circuit 11 through a phase splitting arrangement 23. Since the valve 17 must conduct during a portion of each half cycle to effect the desired regulation of the energy transmitted between the circuits 10 and 11, the grid of this valve must be excited with a double frequency periodic potential. This may be obtained from a transformer 24, the primary winding of which is connected to the circuit 11 through a rotary phase shifting transformer 25 and phase splitting circuit 26 and the secondary winding of which is connected between the grid and the cathode of the valve 17 through a current limiting resistor 20 and the negative bias battery 21. There is also included in this circuit rectifying means, illustrated as a contact rectifier bridge 27, which is effective to change both half cycles of the supply potential to the same polarity, that is, convert it to double frequency. The excitation may be improved by making the transformer 24 self-saturating, as indicated in the drawing to convert the sinusoidal grid potential into one of peaked wave form, as is well understood by those skilled in the art. The above described apparatus, while generally referred to as a single phase full wave converting apparatus, is in reality a two phase half wave converting apparatus, since the two halves of the winding 14 have potentials displaced in phase by 180° and each carries half wave current.

The general principles of operation of the above described apparatus when operating as an inverter transmitting energy from the direct current circuit 10 to the alternating current circuit 11 will be well understood by those skilled in the art. In brief, assuming that the excitation of the valve 17 maintains this valve nonconductive and that the valve 15 is initially rendered conductive, current will flow from the direct current circuit 10 through the left hand portion of the winding 14 and the valve 15 generating one half cycle of alternating current in the circuit 11. If it be assumed that the potentials applied to the grids of the valves 15 and 16 are retarded in phase by substantially 180° less the commutating angle, for example, 170° by means of the rotary phase shifting transformer 22, the valve 16 will be rendered conductive about ten degrees before the potential of the winding 14 reverses polarity and the potential of this winding will be effective to transfer the current from the valve 15 to the valve 16, as is well understood by those skilled in the art. Current will now flow through the right hand portion of the winding 14 and the valve 16 and will generate a half cycle of alternating current of opposite polarity in the alternating current circuit 11. In this manner current is successively commutated between valves 15 and 16 and an alternating current supplied to the circuit 11. These operating conditions are illustrated by the curves of Diagram I of Fig. 4 in which the curve $e_1$ indicates the counter-electromotive force of one portion of the winding 14, for example that impressed upon the anode of the valve 15, while the curve $e_2$ represents that of the other portion of the winding 14 impressed upon the anode of the valve 16. The heavy line portion of this diagram indicates the counter-electromotive force as referred to the direct current circuit and thus shows which of the valves is conductive at any given instant. It is understood that current must be commutated between the valves at some instant $a$ in each half cycle before the counter-electromotive force of the winding 14 reverses polarity in order that this electromotive force will be effective to commutate the current between the valves. The difference in the shaded areas above and below the zero axis must represent the average voltage impressed by the direct current circuit, neglecting the voltage losses in the converting apparatus itself. It is well known in the art that, with such an arrangement, the voltage on the alternating current circuit 11 may be raised by advancing the phase of the grid potentials of the valves 15 and 16. Such conditions are represented by Diagram II of Fig. 4, in which the current is transferred between the valves at the point $b$ in each half cycle. Since, as before, the difference in the shaded areas must represent the average voltage impressed by the direct current circuit, and since this voltage remains constant, the voltage of the alternating current circuit must increase correspondingly in order that the difference in these two areas shall have the same value. Under these conditions it will be seen that the current flows in each of the valves, for example the valve 16, during the interval $b$—$b$ which leads the counter-electromotive force by the angle $180°-b$. As the grid potentials of the valves 15 and 16 are still further advanced to effect further regulation, the phase of the load current is correspondingly advanced with respect to the alternating current circuit and the power factor correspondingly decreased.

However, if the grid potentials of the valves 15 and 16 be set substantially in phase opposition to the electromotive force of the winding 14, except for the necessary commutating angle 180°—a, and the grid excitation supplied to the valve 17 be advanced to the point c represented in Diagram III of Fig. 4, the current will be transferred from the valve 15 to the valve 17 at the point c and the valve 17 will conduct current until the point a, when it is transferred to the valve 16. The voltage of the alternating current circuit will again adjust itself in order to satisfy the condition that the difference in the shaded areas above and below the zero axis as represented in Diagram III shall equal the voltage of the direct current circuit. Diagram III represents the condition in which the difference in these shaded areas is substantially the same as that of Diagram II so that the corresponding voltage will be established on the alternating current circuit. Under these conditions, however, current will flow in each of the valves 15 and 16 during the interval a—c and, it will be seen, this current is more nearly in phase with the electromotive force of the circuit 11 so that the effective power factor on that circuit will be correspondingly improved. In this manner, the relative voltages of the direct and alternating current circuits may be varied within wide limits and the power factor on the alternating current circuit substantially improved over that obtained by merely shifting the phase of the grid potentials of the valves 15 and 16.

The operation of the above described apparatus as a rectifier, transmitting energy from the alternating current circuit 11 to the direct current 10 will be well understood by those skilled in the art. In case it is desired to control the voltage of the direct current circuit 10, the phase of the grid potentials of the valves 15 and 16 may be retarded. Such conditions are illustrated in Diagram IV of Fig. 4, in which the valves 15 and 16 are excited to become conductive at the point d in their respective half cycles of positive anode potential. The reactance device 18, or any reactance in the converting apparatus or its associated circuit, will force the current to continue in the direct current circuit 10 even after the applied electromotive force reverses polarity. This is indicated by the shaded area below the zero axis of Diagram IV. As in the previous case, the difference in the shaded areas above and below the line represents the average voltage of the direct current circuit. With the electric valves conducting during the intervals d—d, it is seen that the current on the alternating current circuit lags the electromotive force by the angle 0°—d. The power factor on the alternating current circuit may be improved by means of the electric valve 17 connected to the neutral point which, when the apparatus is operating as a rectifier, is either excited at the initial portion of each half cycle by means of the rotary phase shifting transformer 25, or if desired, a two-element rectifier valve may be employed without any grid excitation, so that it is continuously conductive. This operation is represented by Diagram V of Fig. 4 which represents an adjustment of the phase of the grid potentials of the valves 15 and 16 to give approximately the same average voltage on the direct current circuit as under the conditions depicted in Diagram IV. It will be seen that the valve 15 is rendered conductive at the point e and conducts for the remaining portion of that half cycle. Beyond that point, however, when the voltage of the reactance in the direct current circuit would tend to maintain the current through this valve against the electromotive force of its associated winding, the current is bypassed through the valve 17; that is, the current flows in the alternating current circuit only during the interval e—180° and this current has a substantially higher effective power factor on the alternating current circuit 11 than that obtained by phase controlling the valves 15 and 16 alone.

In Fig. 2 there is illustrated an extension of my invention to the transmission of energy between a direct current circuit 10 and a three phase alternating current circuit 30. This arrangement includes a transformer comprising a polyphase network 31 connected to the alternating current circuit 30 and a pair of polyphase networks 32 and 33 provided with electrical neutrals interconnected through an interphase inductive winding 34, to the electrical midpoint of which is connected one side of the direct current circuit. Each of the several phase windings of the networks 32 and 33 are provided with electrical midpoints, which, together with the terminals of the networks 32 and 33 are connected to the other side of the direct current circuit through a plurality of electric valves, which may be single cathode valves of the type diagrammatically illustrated in Fig. 1, or as shown in Fig. 2, may comprise a multiple anode grid controlled mercury arc rectifier 35. This arrangement of Fig. 2 combined a type of control disclosed and claimed in the copending application of D. C. Prince, Serial No. 484,692, filed September 26, 1930, and assigned to the same assignee as the present application, with the control described above in connection with Fig. 1. Thus, with this apparatus operating as an inverter transmitting energy from the direct current circuit 10 to the alternating current circuit 30, the minimum voltage on the alternating current circuit is obtained by maintaining the anodes connected to the intermediate terminals and electrical neutrals of the networks 32 and 33 nonconductive. Then by gradually advancing the phase of the grid potentials applied to the grids of the anodes associated with the electrical midpoints of the networks 32 and 33, the voltage of the alternating current circuit 30 may be gradually increased without substantially impairing the power factor on the alternating current circuit. For higher ranges of voltages the anodes associated with the end terminals of the networks 32 and 33 are maintained nonconductive, the grids associated with the anodes connected to the points of intermediate potential are excited with alternating potentials for inverter operation and the potentials applied to the grids of the anodes connected to the electrical neutrals of the networks 32 and 33 are advanced from 180 degrees lagging to increase further the voltage on the alternating current circuit 30. It will be understood that in this arrangement the grids of the anodes connected to the electrical neutrals of the networks 32 and 33 must be excited at triple frequency rather than double frequency as in the arrangement of Fig. 1. In general when the apparatus is operating as an inverter, the grid excitation of the valve connected to the neutral will have a frequency n times the fundamental, where n is the number of phases of the inductive network. Conversely, with the apparatus operating as a rectifier, the maximum voltage on the direct current circuit is obtained when the anodes connected to the end terminals of the networks 32 and 33 are maintained fully conductive. The voltage of the direct current circuit may be gradually reduced by maintaining the anodes associated with the intermediate terminals of the networks 32 and 33 conductive and gradually retarding the phase of the alternating potentials applied to the grids associated with the anodes connected to the end terminals of the networks 32 and 33. The voltage of the direct current circuit 10 may be still further reduced without substantially impairing the power factor on the alternating current circuit 30 by maintaining the anodes associated with the end terminals of the networks 32 and 33 nonconductive, maintaining the anodes connected to the electrical neutrals conductive, and gradually retarding the phase of the potentials applied to the grids associated with the anodes connected to the intermediate terminals of the networks 32 and 33.

In Fig. 3 there is illustrated an embodiment of my invention for transmitting energy from an alternating current supply circuit 40 to one phase of an alternating current load circuit 41. This arrangement includes a pair of valve converting apparatus of the type illustrated in Fig. 1 oppositely connected with respect to the supply circuit 40. One converting apparatus comprises a winding 42 of a transformer 43, provided with a winding 44 connected to the circuit 41, and electric valves 45 and 46 and 47 and 48 connecting the end terminals and the electrical neutral, respectively, of the winding 42 with one side of the supply circuit 40. The other converting apparatus comprises the additional transformer winding 49 and electric valves 50 and 51, and 52 and 53 connecting the end terminals and the electrical neutral, respectively, of the winding 49 with the other side of the alternating current circuit 40. The electrical midpoints of the windings 42 and 49 are connected to opposite terminals of the circuit 40 through mutually coupled windings of a reactance device 57, which is effective to minimize the circulating current between the two converting apparatus in case the voltage of the supply circuit 40 should reverse polarity while one of the converting apparatus is still in operation. The grids of the electric valves 45 and 46, and 50 and 51 connected to the end terminals of the windings 42 and 49 are excited from secondary windings of a grid transformer 58, the primary winding of which is energized from the three phase alternating current circuit 41 through a rotary phase shifting transformer 54. The three phase alternating current circuit 41 is connected to a suitable source of three phase alternating current energy (not shown). Similarly, the grids of the electric valves 47 and 48, and 52 and 53 connected to the electrical midpoints of the windings 42 and 49 are energized from the secondary windings of a grid transformer 55, the primary winding of which is energized from the alternating current circuit 41 through an independent rotary phase shifting transformer 56. The transformer 55 is also preferably of the self-saturating type to provide a grid potential of peaked wave form.

It will be apparent that the operation of the apparatus illustrated in Fig. 3 is similar to that illustrated in Fig. 1, the converting apparatus comprising the winding 42 and the valves 45—48, inc., and that comprising the winding 49 and the valves 50—53, inc., operating on alternate half cycles of the supply circuit 40. By properly adjusting the rotary phase shifting transformers 54 and 56, the voltage ratios of the circuits 40 and 41 may be readily controlled.

While for the sake of simplicity I have illustrated an embodiment of my invention in Fig. 3 as applied to an arrangement for transmitting energy from a relatively low frequency, single phase alternating current circuit to a relatively high frequency single phase alternating current circuit, it will be obvious to those skilled in the art that it is equally applicable to any of the other several types of electric valve frequency changers well known in the art.

While I have described what I at present consider preferred embodiments of my invention, it will be obvious to those skilled in the art that various changes and modifications may be made without departing from my invention, and, I, therefore, aim in the appended claims to cover all such changes and modifications as fall within the true spirit and scope of my invention.

What I claim as new and desire to secure by Letters Patent of the United States, is:

1. In combination, a supply circuit, a load circuit, one of said circuits being an alternating current circuit, electric valve converting apparatus including an inductive winding provided with end terminals and an electrical neutral and an electric valve connected to each of said terminals and said neutral and interconnecting said circuits through said winding, and means for independently controlling the conductivity of said valve connected to said neutral and the others of said valves to control the relative voltages of said circuit.

2. In combination, a supply circuit, a load circuit, one of said circuits being an alternating current circuit, electric valve converting apparatus including an inductive winding provided with end terminals and an electrical neutral and a grid controlled electric valve connected to each of said terminals and said neutral and interconnecting said circuits through said winding, means for impressing periodic potentials upon the grids of said valves, and means for independently varying the phase of the periodic potentials applied to the grids of the valves associated with said end terminals and that applied to the grid of the valve associated with said neutral to control the relative voltages of said circuits.

3. In combination, a direct current supply circuit, an alternating current load circuit, electric valve converting apparatus including an inductive winding provided with end terminals and an electrical neutral and a grid controlled electric valve connected to each of said terminals and said neutral and interconnecting said circuits through said winding, means for exciting the grids of the valves associated with said end terminals with an alternating potential substantially in phase opposition to that of said load circuit for inverting operation of said apparatus, and means for exciting the grid of the other valve with a periodic potential variable in phase to control the voltage of said load circuit.

4. In combination, a direct current supply circuit, an alternating current load circuit, electric valve converting apparatus including an inductive winding provided with end terminals and an electrical neutral and a grid-controlled electric valve connected to each of said terminals and said neutral and interconnecting said circuits through said winding, means for exciting the grids of the valves associated with said end terminals with an alternating potential substantially in phase opposition to that of said load circuit for inverting operation of said apparatus, and means for exciting the grid of the other valve with a periodic potential variable in phase from substantially phase opposition to substantially phase coindence to vary the voltage of said load circuit from minimum to maximum.

5. In combination, a direct current supply circuit, an alternating current load circuit, electric valve converting apparatus including an $n$ phase inductive winding provided with $n$ end terminals and an electrical neutral and a single grid controlled electric valve connected to each of said terminals and said neutral and interconnecting said circuits through said windings, means for exciting the grids of the valves associated with said end terminals with an alternating potential substantially in phase opposition to that of said load circuit for inverting operation of said apparatus, means for exciting the grid of the valve associated with said neutral including a source of periodic potential of a frequency equal to $n$ times that of said alternating current load circuit, and means for varying the phase of said periodic potential to control the voltage of said load circuit.

6. In combination, a direct current supply circuit, an alternating current load circuit, electric valve converting apparatus including an inductive winding provided with end terminals and an electrical neutral and a single grid controlled electric valve connected to each of said terminals and said neutral and interconnecting said circuits through said windings, means for exciting the grids of the valves associated with said end terminals with an alternating potential substantially in phase opposition to that of said load circuit for inverting operation of said apparatus, means for obtaining an alternating potential variable in phase with respect to that of said load circuit, means for rectifying said variable phase potential and means for impressing said rectified potential on the grid of the valve associated with said neutral to control the voltage of said load circuit.

7. In combination, a supply circuit, a load circuit, one of said circuits being an alternating current circuit, electric valve converting apparatus including an inductive winding provided with end terminals, intermediate terminals and an electrical neutral and an electric valve connected to each of said terminals and said neutral and interconnecting said circuits through said winding, and means for independently controlling the conductivity of said valves associated with said end terminals, said valves associated with said intermediate terminals, and said valve associated with said neutral.

8. In combination, a supply circuit, a load circuit, one of said circuits being an alternating current circuit, electric valve converting apparatus including a pair of inductive windings each provided with end terminals and an electrical neutral, an interphase inductive winding interconnecting said neutrals, and an electric valve connected to each of said terminals and said neutrals and interconnecting said circuits through said winding, and means for independently controlling the conductivity of said valves connected to said neutrals and said valves connected to said end terminals to control the relative voltages of said circuits.

9. In combination, an alternating current supply circuit, an alternating current load circuit, electric valve converting apparatus including a pair of inductive windings each provided with end terminals and an electrical neutral and an electric valve connected to each of said terminals and said neutrals and interconnecting said circuit through said windings, said valves associated with one winding being oppositely disposed with respect to one of said circuits from those associated with the other winding, and means for independently controlling the conductivity of said valves connected to said neutrals and said valves connected to said end terminals to control the relative voltages of said circuits.

BURNICE D. BEDFORD.